United States Patent
Hammermeister et al.

(10) Patent No.: US 6,680,938 B1
(45) Date of Patent: Jan. 20, 2004

(54) METHOD AND APPARATUS FOR CROSS-CONNECTING DATA STREAMS WITH EFFICIENT MEMORY UTILIZATION AND TRANSPARENT PROTOCOL CONVERSION

(75) Inventors: Karl H Hammermeister, Nepean (CA); Richard G. Kusyk, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/494,518

(22) Filed: Jan. 31, 2000

(30) Foreign Application Priority Data

Dec. 20, 1999 (CA) ............................................. 2293066

(51) Int. Cl.[7] .......................... H04Q 11/04; G06F 12/00
(52) U.S. Cl. ...................... 370/360; 370/382; 370/506; 710/20; 710/56
(58) Field of Search .................. 370/357, 360, 370/366, 375, 376, 381, 382, 383, 412, 428, 465, 466, 467, 476, 503, 505, 506; 710/3, 20, 29, 36, 52, 56; 711/154, 170, 202

(56) References Cited

U.S. PATENT DOCUMENTS

| | | | |
|---|---|---|---|
| 4,495,615 A | * | 1/1985 | Wilcke ........................ 370/58 |
| 4,875,157 A | * | 10/1989 | Frimmel, Jr. et al. ....... 364/200 |
| 4,967,405 A | | 10/1990 | Upp et al. ...................... 370/1 |
| 5,040,170 A | | 8/1991 | Upp et al. ................... 359/135 |
| 5,265,090 A | * | 11/1993 | Guinand et al. ............ 370/58.1 |
| 5,267,239 A | | 11/1993 | Pospischil et al. .......... 370/112 |
| 5,315,594 A | | 5/1994 | Noser ....................... 370/110.1 |
| 5,351,238 A | * | 9/1994 | Ashi et al. ..................... 370/66 |
| 5,465,252 A | | 11/1995 | Müller ....................... 370/65.5 |
| 5,563,877 A | | 10/1996 | Van Tetering et al. ..... 370/58.2 |
| 5,579,310 A | | 11/1996 | Heiles et al. ................. 370/60 |
| 5,737,570 A | * | 4/1998 | Koch .......................... 395/476 |
| 5,923,653 A | | 7/1999 | Denton ........................ 370/375 |
| 6,031,842 A | * | 2/2000 | Trevitt et al. ............... 370/412 |

* cited by examiner

Primary Examiner—Alpus H. Hsu
(74) Attorney, Agent, or Firm—Kent Daniels Ogilvy Renault (57) ABSTRACT

A method and system enable cross connection of an incoming data stream to one or more outgoing data streams. Each data stream comprises respective incoming and outgoing frames. Each frame includes one or more rows, and each row comprises a respective plurality of data segments. A reserved memory space is provided having a data storage capacity equal to an integer multiple of a data segment and less than one complete row. A data segment of an incoming row of an incoming frame is written to the reserved memory space. Subsequently, the data segment of the incoming row is read to an outgoing row of an outgoing frame from the reserved memory space. The writing and reading steps are timed such that the data segment is read from the reserved memory space before being over-written by another data segment.

50 Claims, 5 Drawing Sheets

METHOD AND APPARATUS FOR CROSS-CONNECTING DATA STREAMS WITH EFFICIENT MEMORY UTILIZATION AND TRANSPARENT PROTOCOL CONVERSION

CROSS-REFERENCE TO RELATED APPLICATIONS

This is the first application filed for the present invention.

MICROFICHE APPENDIX

Not Applicable.

TECHNICAL FIELD

The present invention relates to synchronous data communication systems, and in particular to a method and apparatus for cross-connecting synchronous data communication streams with efficient memory utilization and transparent protocol conversion.

BACKGROUND OF THE INVENTION

Modern synchronous data communications networks are typically designed to carry payload data using one of the Synchronous Digital Hierarchy (SDH) and Synchronous Optical Network (SONET) protocols. In each of these protocols, payload data is transported within frames in which data is conveniently organized into rows. Typically, each row is subdivided into a plurality of (e.g. ninety) data segments (columns), each of which may comprise one or more bytes of data. Normally, each row includes overhead (e.g. including transport overhead (TOH) and path overhead (POH)), payload data and fixed stuff. Under the SDH protocol, six data segments of overhead (three data segments each of TOH and POH) are grouped at the head of each row, followed by eighty-four data segments of payload data organized into twenty-one Tributary Units (TUs) of four data segments each. In contrast, a row of an SPE under the SONET protocol includes an overhead portion having three data segments of TOH and one data segment of POH. The payload data is organized into a set of twenty-eight Virtual Tributarys (VTs) of three data segments each, which are separated by one data segment of fixed stuff. Each of the TUs and VTs may be organized into a predetermined number of groups and/or channels.

In general, the TOH is arranged in a header portion of each row of a frame, while the POH, payload, and fixed stuff are arranged into an SPE, which may float within the envelope capacity of the frame. However, in the interests of simplifying the present description, the SPE is considered to be column-aligned to a fixed position within the frame, starting immediately after the TOH in the first row.

While each row of an SDH frame carries the same amount of payload and overhead (including fixed stuff) as a corresponding row of a SONET frame, the different row formats require that SDH and SONET traffic be transported over separate equipment. When it is necessary to cross-connect SDH and SONET traffic (for example, at a gateway connecting SDH and SONET networks) it is necessary to perform a SONET/SDH conversion as part of the cross-connection.

It is known to provide a cross-connection and protocol conversion function within an Application Specific Integrated Circuit (ASIC) in which a three port Random Access Memory (RAM) is used to provide a cross-connection between a plurality of input ports and a corresponding plurality of output ports. An associated core logic controls the writing of incoming data to the RAM and subsequent reading of outgoing data from the RAM to provide cross-connection, SONET/SDH frame format conversion and channel reordering functionality. Conventionally, the cross-connection function is performed on a row-by-row basis. Thus an entire incoming row of an incoming frame is written to a sector of the RAM. The data segments of the stored row are subsequently read from that sector of the RAM, perhaps with channel reordering and/or a frame format conversion to form at least part of one or more outgoing frame rows. In order to guarantee data integrity (i.e., temporal ordering of data segments), it is common to write the next incoming row to a second sector of the RAM during the read operation of the stored row. This eliminates a possibility that data of a stored row is overwritten before it is read out to an outgoing row.

The above described ASIC is capable of handling a large number of cross-connections, each involving high speed synchronous data streams. However, an important limitation on the capacity of the ASIC is the amount of RAM required to perform the cross-connection. In particular, cross-connection of an input data stream to its corresponding output data stream requires, for each row cross-connection, sufficient memory space to store two complete rows. Increasing the number of cross-connections which may be handled by the ASIC necessarily requires a corresponding increase in the amount of available RAM, and this in turn requires a larger and more complex core logic in order to provide addressing within the RAM.

Accordingly there remains a need for a method by which data streams can be cross-connected with an efficient utilization of RAM allocated to each cross-connection.

SUMMARY OF THE INVENTION

Accordingly, an object of the present invention is to provide a method and apparatus for cross-connecting synchronous data streams, in which the RAM allocated to each cross-connection is efficiently utilized.

Another object of the present invention is to provide a method and apparatus for cross-connecting synchronous data streams, in which the sequence in which incoming data is written into the RAM is independent of a format of the incoming data stream.

A further object of the present invention is to provide a method and apparatus for cross-connecting synchronous data streams, in which channel reordering and protocol conversions are implemented by controlling the sequence in which data is read from the RAM.

Accordingly, an aspect of the present invention provides a method of cross connecting an incoming data stream to one or more outgoing data streams. Each data stream comprises respective incoming and outgoing frames. Each frame includes one or more rows, each row comprising a respective plurality of data segments. The method comprises the steps of: providing a reserved memory space having a data storage capacity equal to an integer multiple of a data segment and less than one complete row; writing a data segment of an incoming row of an incoming frame to the reserved memory space; subsequently reading the data segment from the reserved memory space to an outgoing row of an outgoing frame; and timing the writing and reading steps such that the data segment is read from the reserved memory space before being over-written by another data segment.

A further aspect of the present invention provides a system for cross connecting an incoming data stream to one or more outgoing data streams, each of the incoming and outgoing data streams comprising respective incoming and outgoing frames, each frame including one or more rows, each row comprising a respective plurality of data segments, the system comprising: a reserved memory space having a data storage capacity equal to an integer multiple of a data segment and less than one complete row; means for writing a data segment of an incoming row of an incoming frame to the reserved memory space; means for reading the data segment of the incoming row to an outgoing row of an outgoing frame from the reserved memory space; and means for timing the writing and reading of the data segment such that the data segment is read from the reserved memory space before being over-written by another data segment In a preferred embodiment of the present invention, each data segment comprises one or more bytes of data.

In a preferred embodiment of the present invention, the step of writing a data segment comprises a step of writing sequential data segments of the incoming frame to the reserved memory space in accordance with a predetermined first address sequence in which a start address for a given row commences immediately after a finish address of a previous row.

Preferably, the first address sequence is independent of a format of the incoming SPE.

Preferably, the first address sequence is different for each successive row of the incoming SPE and is repeated every three rows.

In a preferred embodiment of the present invention, the step of writing data segments of the incoming frame in accordance with the first address sequence comprises, for each row of the incoming frame, the steps of: writing sequential data segments of the incoming row to a sequential series of memory addresses between the base address and a predetermined threshold address; subsequently writing sequential data segments of the incoming row to a sequential series of memory addresses between a selected start address and the end address; and subsequently writing sequential data segments of the incoming row to a sequential series of memory addresses between the threshold address and a finish address.

Preferably, the predetermined threshold address is located at a fixed offset from the base address.

Preferably, the start address is selected on a basis of the finish address of an immediately preceding row. Still more preferably, the start address is selected to correspond to: the next available address after the threshold address if the finish address of the previous row corresponds to the end address; and otherwise the next available address after the finish address of the previous row.

In a preferred embodiment of the present invention, the step of reading the data segment comprises the step of reading data segments of each one of the one or more outgoing frames from the reserved memory space between the base address and the end address in accordance with a predetermined second address sequence. Preferably the step of reading data segments in accordance with the second address sequence comprises, in respect of each incoming row, the steps of: successively accessing each one of a plurality of blocks of memory addresses, each block of memory addresses being smaller than the reserved memory address space and comprising a respective predetermined number of data segments; and reading one or more data segments of an outgoing frame from an accessed block of memory addresses.

In a preferred embodiment of the present invention, the step of successively accessing each one of a plurality of blocks of memory address comprises: accessing one or more header blocks corresponding to an overhead portion of the incoming row; and accessing a plurality of payload memory blocks, each payload memory block corresponding to a respective payload portion of the incoming row.

In embodiments of the invention, each one of the one or more header blocks are preferably accessed in succession, and then each one of the plurality of payload blocks are successively accessed. Each payload memory block preferably comprises a predetermined number of contiguous data segments. In some embodiments of the invention, each payload memory block comprises 21 contiguous data segments. In this case, four payload memory blocks are accessed to read data segments of an entire row.

In embodiments of the invention, a payload portion of the incoming row includes at least one data segment of embedded fixed stuff, and in such cases the payload memory blocks are preferably arranged to exclude the embedded fixed stuff data segments. At least one fixed stuff data segment can be accessed prior to accessing each payload memory block.

In embodiments of the present invention, each payload memory block comprises one or more respective sub-blocks, which may be accessed simultaneously. Preferably, each payload memory block encompasses a predetermined number of data segments, the predetermined number being defined by a sum of a number of data segments comprising each respective sub-block. Still more preferably, the predetermined number of data segments encompassed by each payload memory block is the same for every block. In one embodiment of the invention, the predetermined number of data segments within each block is 28.

The step of reading one or more data segments of an outgoing row from an accessed block of memory addresses comprises reading each data segment within the accessed block sequentially, or in accordance with provisioned channel reordering.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
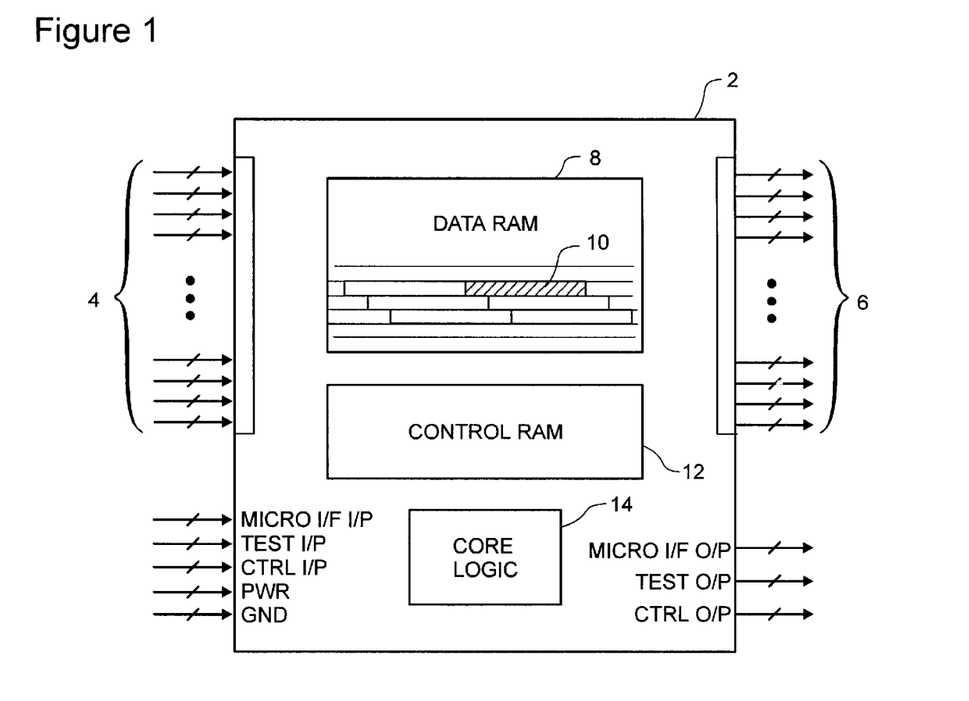
FIG. 1. is a block diagram schematically illustrating an Application Specific Integrated Circuit (ASIC) for cross-connecting data streams in accordance with an embodiment of the present invention.

As shown in FIG. 1, the present invention provides a system 2 (which may conveniently be constructed in the form of an Application Specific Integrated Circuit (ASIC)) which provides cross-connection of multiple incoming and outgoing synchronous data streams. The system 2 comprises a plurality of input ports 4, each of which is designed to receive a respective incoming data stream. A plurality of output ports 6 are provided to generate respective outgoing data streams. A multi-port data RAM 8 is connected to the input ports 4 and the output ports 6 so that data segments of incoming frames can be written to the data RAM 8 and data segments of outgoing frames can be read from the data RAM 8. In order to facilitate the writing and reading of data segments, a respective reserved memory space 10 within the data RAM 8 is allocated to each cross-connection. A control RAM 12 and a core logic 14 are provided to control the cross-connection between respective input ports 4 and output ports 6 and addressing within the data RAM 8 to facilitate the writing and reading processes. Thus for each out-put port 6 to be cross-connected, the control RAM 12 will typically include: information identifying a respective input port 4, information identifying respective formats of the incoming and outgoing data streams, and the VT/TU size. The core logic 14 (which may conveniently be implemented as a hard-wired logic) operates to interact with the control RAM 12, the data RAM 8 and the respective input and output ports 4,6 to facilitate cross-connection of data streams in the manner which will be described in greater detail below. The core logic 14 implicitly provides addressing information identifying at least a base address and end address of the respective reserved memory space 10 of the data RAM 8 which is used for cross-connecting data flow between the respective input and output ports 4,6 (described in greater detail below).

Figure 2:
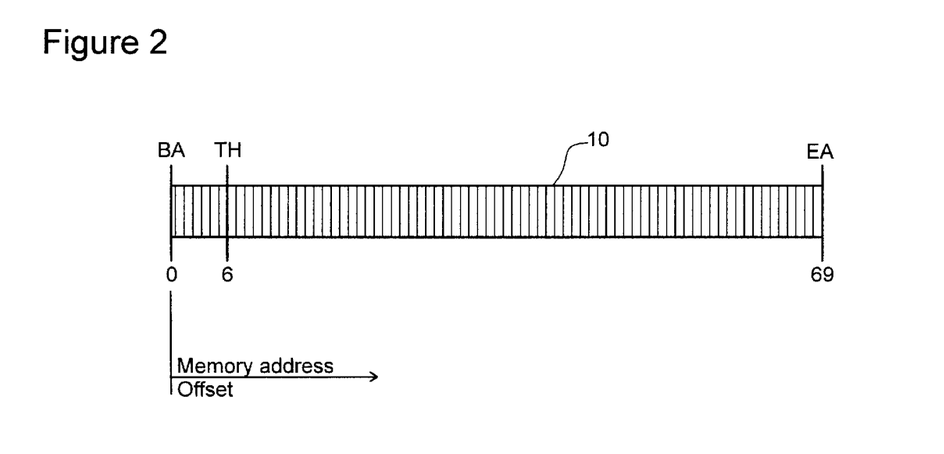
FIG. 2 is an address chart schematically illustrating a reserved memory space allocated to a cross-connection in accordance with the embodiment of FIG. 1.

FIG. 2 shows a reserved memory space 10 within the data RAM 8 allocated to a cross-connection of an incoming data stream to one or more outgoing data streams. In accordance with the present invention, the data storage capacity of the reserved memory space 10 is less than that required to store an entire row of an incoming frame. In the illustrated embodiment, the data storage capacity of the reserved memory space 10 is equivalent to 69 data segments (frame columns), and is conveniently provided as a contiguous block of memory addresses between a base address BA (having a memory address offset of 0 data segments) and an end address EA (having a memory address offset of 68 data segments), and which is sufficient to store 69 of the 90 data segments of an incoming frame row. Those skilled in the art will recognize that the data storage capacity of the reserved memory space 10 may be more, or less, than 69 data segments. The use of a memory capacity equivalent to 69 data segments is advantageous in that it facilitates convenient cyclic write and read sequences (as will be described below) when used in conjunction with incoming frames having rows that are 90 data segments in length. However, it will be appreciated that an SPE may be formatted with more or less that 90 data segments in each row. Similarly, cyclic write and read sequences may also be established when the data capacity is other than 69 data segments. In general, the reserved memory space 10 may have any arbitrary capacity (two data segments capacity is a practical lower limit), provided that it is an integer multiple of a data segment and less than one complete row of an incoming SPE.

Since the total capacity of the reserved memory space 10 allocated to each cross-connection is less than that required to store an entire frame row, the present invention requires timed writing and reading processes that ensure reliable cross-connection of incoming and outgoing data streams. These writing and reading processes, which are controlled by the core logic 14 on the basis of information stored in the control RAM 12, are described below with reference to FIGS. 3–5.

Figure 3:
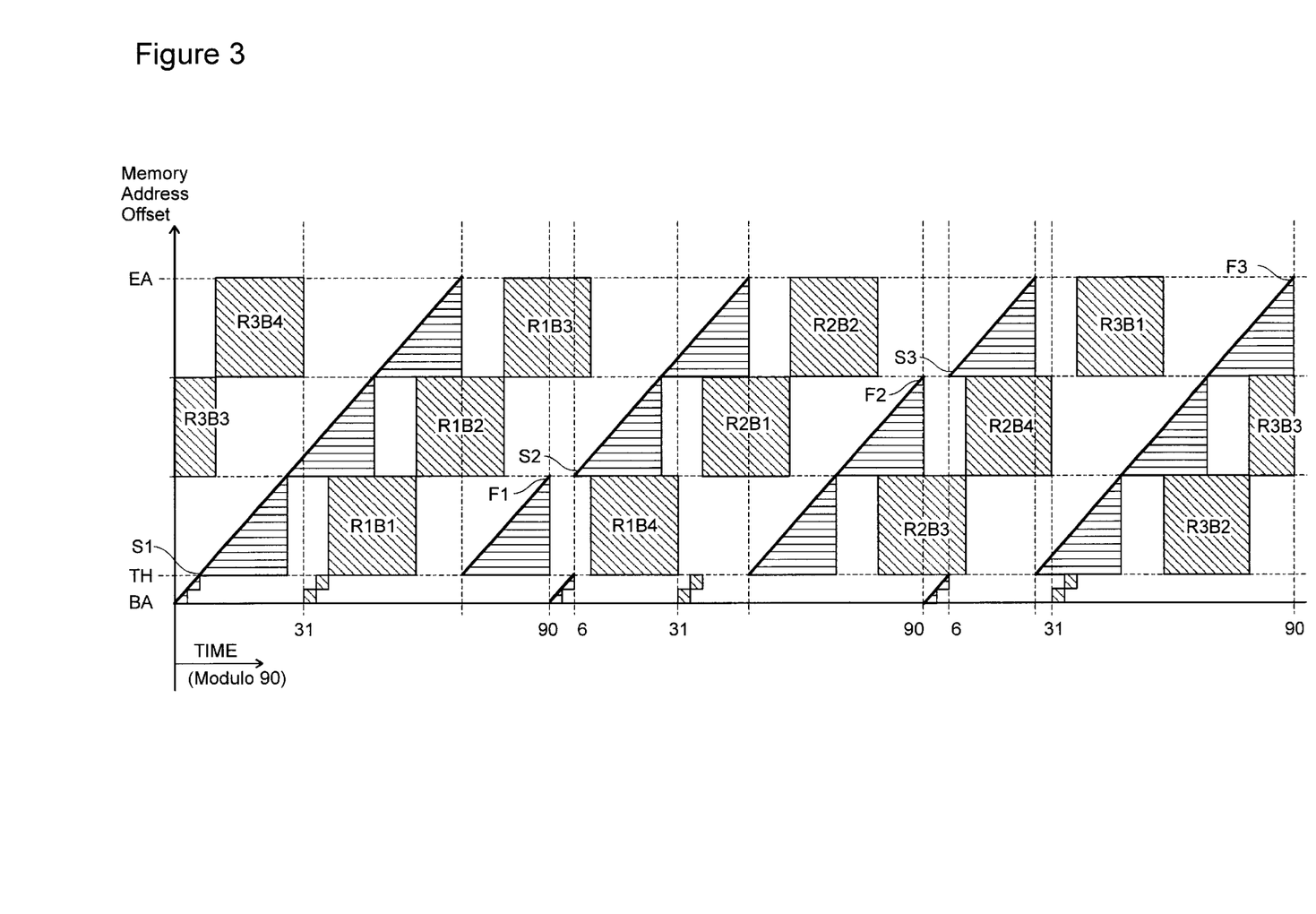
FIG. 3 is an address/time chart schematically illustrating timed writing and reading processes in accordance with an embodiment of the present invention in which both incoming and outgoing SPE's are SDH formatted.
Figure 4:
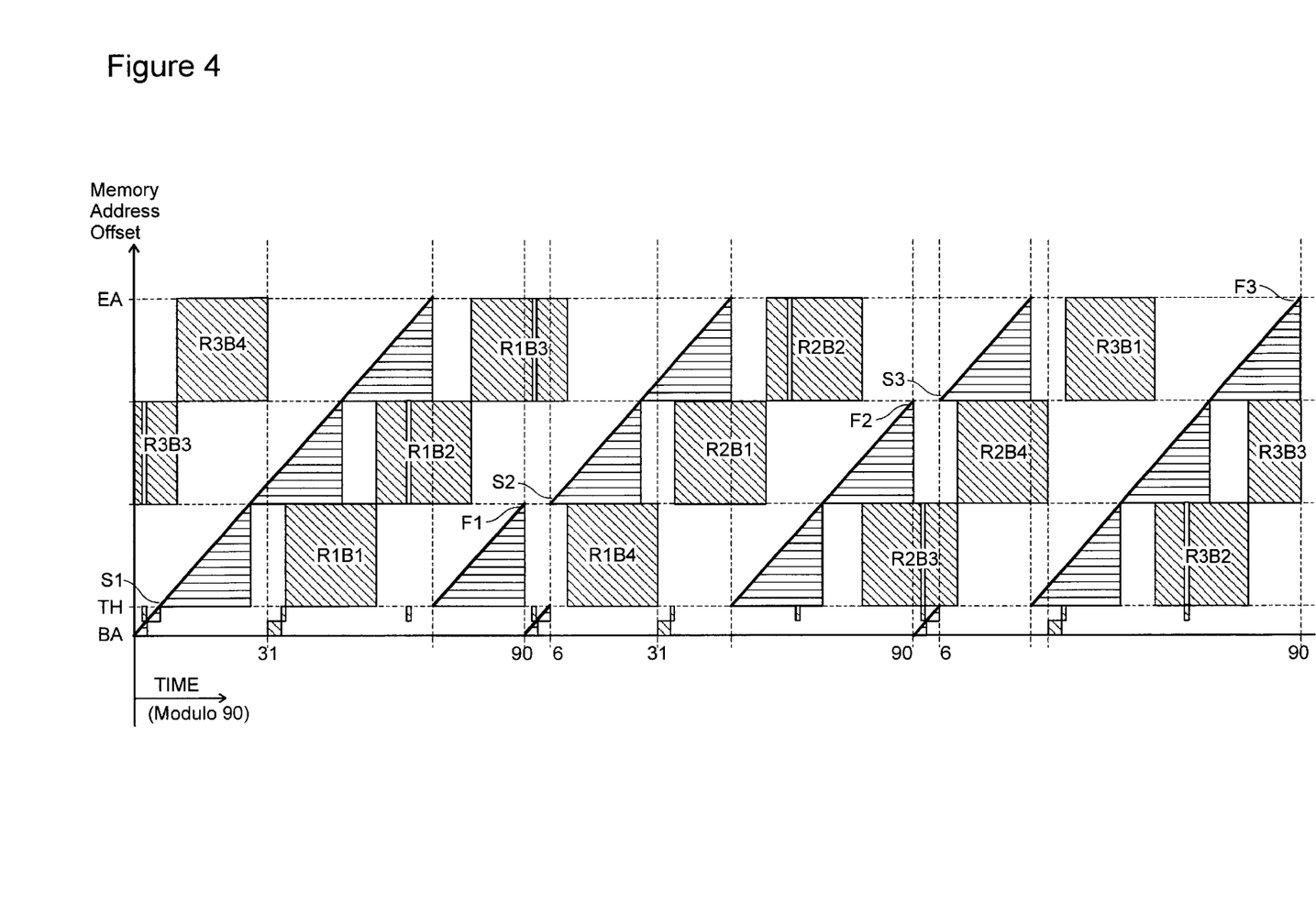
FIG. 4 is an address/time chart schematically illustrating timed writing and reading processes in accordance with an embodiment of the present invention in which incoming SPE's are SDH formatted and outgoing SPE's are SONET formatted.
Figure 5:
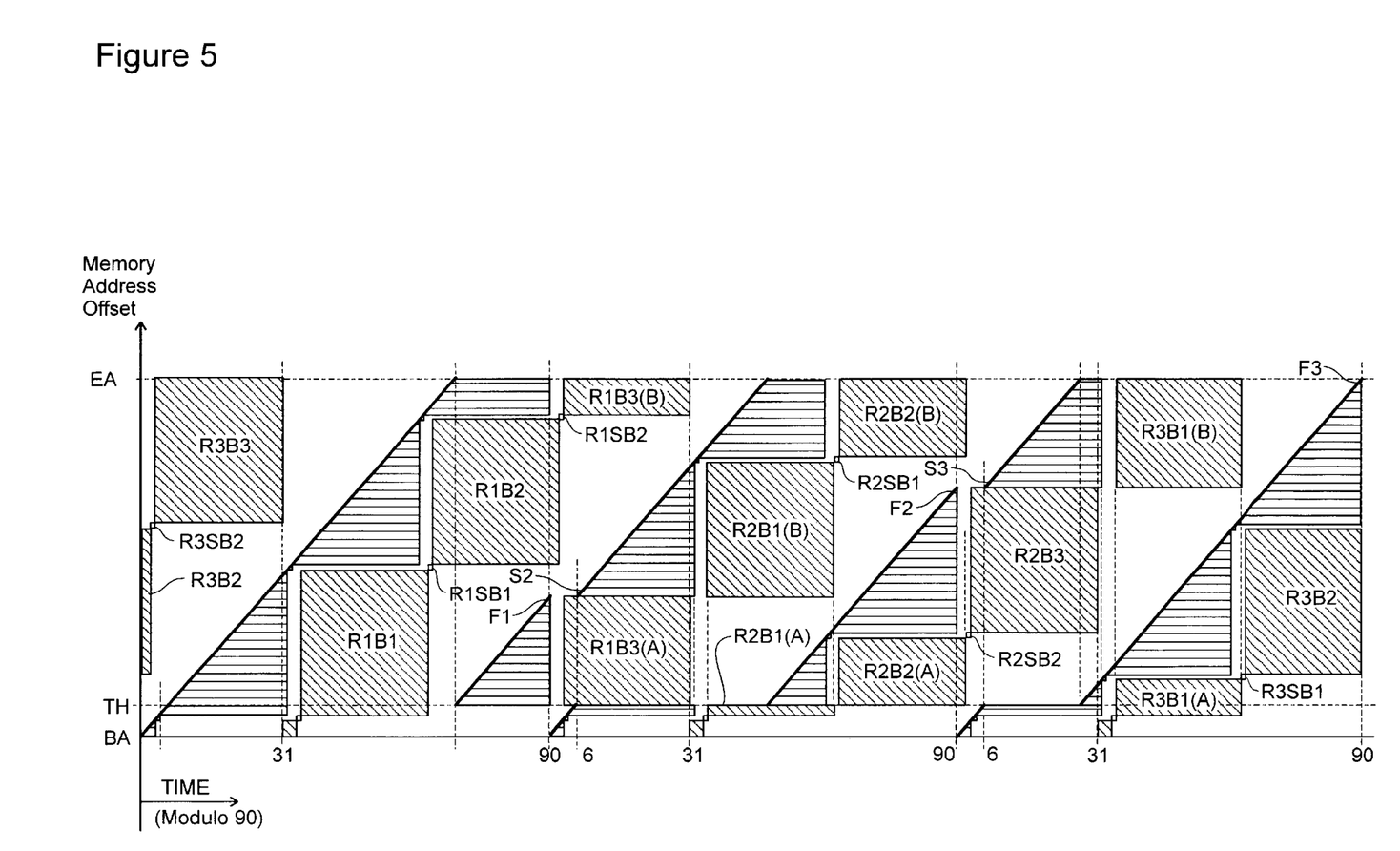
FIG. 5 is an address/time chart schematically illustrating timed writing and reading processes in accordance with an embodiment of the present invention in which both incoming and outgoing SPE's are SONET formatted.

FIGS. 3 through 5 provide address/time charts which illustrate the timed writing and reading processes for a series of three successive rows of an incoming frame. In each chart, the sequence in which incoming data segments are written to the reserved memory space 10 is shown as a heavy diagonal line, and the memory space occupied by stored VTs or TUs is illustrated by triangular or trapezoidal regions shaded by horizontal hash lines. Similarly, the process by which data segments of outgoing SPE's are read from the reserved memory space 10 is schematically illustrated by rectangular regions shaded by diagonal hash lines.

It is convenient to generalize the process of writing data segments to the reserved memory space 10 using the following pseudo-code:

SET S=TH+1 data segment
BEGIN LOOP
   WRITE data segments from BA to TH
   WRITE data segments from S to EA
   WRITE data segments from TH+1 data segment to F
   IF F=EA THEN
     SET S=TH+1 data segment
   ELSE
     SET S=F+1 data segment
REPEAT LOOP As illustrated by the above pseudo-code, and shown in FIG. 3, data segments of each row of an incoming frame are sequentially written to the reserved memory space 10 between the base address BA and the threshold address TH. Writing of sequential data segments continues between the start address S (which, for the first row, is the next available address after the threshold address TH) and the end address EA. Finally, the trailing portion of the incoming row is written to the reserved memory space 10 from the next available address after the threshold address TH and a finish address F.

If the finish address F corresponds to the end address EA (which is the case for the third row, see F3—FIG. 3), then the start address S for the next row is set to the next available address after the threshold address TH. Otherwise, the start address S for the next row is set equal to the finish address F plus one data segment. This latter condition operates for each of the first and second rows, such that data segments of the second row will not over-write data segments of the first row before they have been read; and data segments of the third row will not over-write data segments of the second row before they have been read.

As mentioned above, the data capacity of the reserved memory space 10 allocated for storing a row of a frame can be arbitrarily selected (provided only that all data segments of incoming frames can be written into the reserved memory space 10 and subsequently read to outgoing frames without data loss). Similarly, the location of the threshold address TH can be arbitrary. It is preferable, however, to select the total capacity of the reserved memory space 10 and the location of the threshold address TH based on the size of a row of a frame. In the illustrated embodiment, each row comprises 90 data segments, including, for example in the case of a SONET formatted frame, three data segments of transport overhead (TOH), 1 data segment of path overhead (POH), 84 data segments of payload, and 2 data segments of fixed stuff. Thus it is convenient to provide a total capacity equivalent to 69 data segments (i.e., the base address BA is at an offset of 0, and the end address EA is at an offset of 68 data segments) and to set the threshold address TH at a fixed offset equivalent to 5 data segments from the base address BA. This arrangement is particularly advantageous in that it ensures that:

the memory address space between the base address BA and the threshold address TH is sufficient to store all of the overhead data segments and fixed stuff of the incoming row, and the memory address space above the threshold address TH and the end address EA is sufficient to store ¾ of the payload data segments of the incoming row. Consequently, the writing process described above will yield a cyclic pattern that repeats every three rows;

the start address S is always at a known offset from the base address (equivalent to 6(=TH+1), 27 and 48 data segments, respectively, for the first, second and third rows); and the finish address F is always at a known offset from the base address (equivalent to 26, 47 and 68(=EA) data segments, respectively, for the first, second and third rows).

Thus the start and finish addresses S and F for writing data segments of incoming rows is different for each successive row, and repeats on every third row. This cyclic repetition of the write sequence, coupled with the independence of the write sequence from the format of the incoming frame, serves to simplify the core logic 14 required to implement the writing process.

The process of reading data segments from reserved memory space 10 closely follows the above-described process of writing data segments. Thus the reading sequence is cyclic, with different start and finish addresses S and F for each row, and repeating every three rows. For each row, the threshold address TH, start address S and the finish address F used during the reading sequence are identical to those employed during the writing sequence. However, unlike the writing sequence, provisioned channel reordering (at least within the VTs or TUs of the incoming SPE) must be accommodated. This is accomplished by defining a respective payload memory block corresponding to each VT or TU of the incoming SPE. It is also convenient to define one header memory block corresponding to the TOH data segments, and a second header memory block corresponding to the POH (and which may also encompass fixed stuff data segments). With this arrangement, the reading of data segments proceeds by accessing each respective memory block in turn, the location and access order of the memory blocks tracking the location and writing order of the overhead, fixed stuff and VTs or TUs of the incoming frame. Thus in general, the size and distribution of the header and payload memory blocks are determined by the format (SONET or SDH) of the incoming frame; while the sequence in which the header and payload blocks are accessed is determined by the format of the outgoing SPE. Within any memory block, data segments may be read sequentially or non-sequentially as required to accommodate provisioned channel reordering.

In the address/time chart of FIG. 3, both incoming and outgoing frames are SDH formatted. Thus, the incoming and outgoing data streams are cross-connected without protocol conversion. Accordingly, the read process needs to read three data segments of TOH; three data segments of POH; and then twenty-one TUs of four data segments each.

As shown in FIG. 3, the TOH and POH of the row are read from respective header memory blocks extending between the base address BA and the threshold address TH. Data segments of each TU are then read from respective payload memory blocks between the threshold address TH and end address EA. As mentioned above, the size, location and order in which payload memory blocks are read follows the sequence in which TUs of the incoming row were previously written into the reserved memory space 10. Thus for the first row of the incoming frame, a series of three payload memory blocks R1B1–R1B3 are read, in turn, starting from the threshold address TH and progressing to the end address EA, followed by a fourth payload block R1B4 extending between the threshold address TA and the finish address F1.

For a second row of the incoming frame, a series of two payload memory blocks R2B1 and R2B2 between the start address S2 and the end address EA are read, followed by a second series of two payload memory blocks R2B3 and R2B4 between the threshold address TH and the finish address F2 of the second incoming row.

Finally, for a third row of the incoming frame, a single payload memory block R3B1 extending between the start address S3 and the end address EA is read; followed by a sequential series of three payload memory blocks R3B2–R3B4 between the threshold address TH and the finish address F3 of the third incoming row (corresponding with the end address EA) are accessed in turn.

Within each of the payload memory blocks RxBy (where "x" is the row number, and "y" is the payload memory block number within the row), data segments can read in any order required to accommodate provisioned channel reordering by conventional techniques. Additionally, it is possible to extend the header block containing the POH to also include memory addresses contained by the first payload memory block RxB1 of each row. This also facilitates channel reordering.

As shown in FIG. 3, each of the payload memory blocks RxBy is of equal size (in the illustrated embodiment, equivalent to 21 data segments to thereby capture one data segment of each TU) and are read in sequential order. Timing between the write sequence and read sequence is accomplished by starting the read sequence at a predetermined delay after start of the write sequence. In the illustrated embodiment, the predetermined delay is at a time T=31, which means that the first data segment of the incoming row is read simultaneously with writing of the $31^{st}$ data segment of the row. This delay, in combination with the size of each payload memory block RxBy, ensures that data segments of each incoming row will be read from the reserved memory space 10 before being overwritten. Thus cross-connection between incoming and outgoing frames is accomplished and integrity (temporal ordering) of the data maintained, while using less memory than needed to store an entire row of a frame at one time.

A delay period of T=31 is also advantageous in that the same delay can be used independently of the SDH or SONET formatting of the incoming frames.

FIG. 4 shows timed writing and reading sequences in which incoming frames are SDH formatted, while the outgoing frames are SONET formatted. The process by which data segments of the incoming frame are written into the reserved memory space 10 is identical to that described above with reference to FIG. 3, and thus the pattern of memory utilization by TUs of the incoming frame is identical to that shown in FIG. 3. Similarly, the location of the header and payload memory blocks closely follows the location and sequencing of the TUs of the incoming frame. However, in order to accommodate the SONET format of the outgoing frames, the sequence in which memory blocks are accessed, and data segments read therefrom, differs somewhat from that of FIG. 3.

As shown in FIG. 4, data of the outgoing SPE is read from the data RAM as follows:

overhead data segments of the incoming row, comprising three data segments of TOH and one data segment of POH are read from respective header blocks of memory addresses between the base address BA and the threshold address TH;

payload data segments of the incoming SPE are then read from a series of payload memory blocks RxBy between the first address above the threshold address TH and the end address EA. The location and sequence in which each of the payload memory blocks RxBy are accessed are identical to that described above with respect to FIG. 3;

after reading 28 data segments (from one or more payload memory blocks RxBy), one fixed stuff data segment is read from the POH header block. Alternatively, the fixed stuff data segment may also be read from within a payload memory block.

This process yields a standard SONET formatted frame row having an overhead portion consisting of three data segments of TOH and one data segment of POH, and twenty-eight VTs of three data segments each separated by one data segment of fixed stuff.

FIG. 5 is an address/time chart illustrating timed writing and reading processes, in which both the incoming an outgoing frames are SONET formatted. Thus the incoming row consists of an overhead portion having three data segments of TOH and one data segment of POH, and a payload portion consisting of twenty-eight VTs of three data segments, each of which are separated by one data segment of fixed stuff. The process for writing the data segments of the incoming row to the reserved memory space 10 is identical to that described above with respect to FIGS. 3 and 4.

While the writing process is identical to that described above with respect to the FIGS. 3 and 4, the different distribution of data (e.g. the presence of fixed stuff embedded within the payload data, and the larger number of smaller VTs) means that the pattern of memory utilization by the VTs of the incoming (SONET) row is different from that of an incoming (SDH) row.

As discussed above, the size and distribution of header and payload memory blocks closely follows the pattern of memory utilization by overhead (TOH and POH) and VTs of the incoming row. As shown in FIG. 5, this results in three data segments of TOH and one data segment of POH being read from respective header blocks starting at the base address BA. As shown in FIG. 5, because of the pattern of memory utilization by VTs of the incoming row, one or more logical payload memory blocks may be divided into sub-blocks. Since an incoming SONET frame has twenty-eight VTs of three data segments each, the total memory space encompassed by the sub-blocks forming each logical payload memory block RxBy is twenty-eight data segments. Additionally, one data segment of fixed stuff is read from a respective stuff block RxSBn between each of the payload memory blocks RxBy. As shown in FIG. 5, this yields a reading sequence which is different for each successive row of the outgoing frame, and repeats on every third row.

In a first row, the first data segment of each VT is read from a single payload block R1B1 of 28 data segments extending between addresses offset at 4 and 31 data segments from the base address BA. The second data segment of each VT is read from a second unitary payload data block R1B2 of 28 data segments extending between addresses offset at 33 and 60 data segments from the base address BA. The third data segment of each VT ise read from a corresponding third block R1B3 which consists of two sub-blocks: a first sub-block R1B3(A) of 21 data segments extending between the threshold address TH and the finish address F1 of the first incoming row; and a second sub-block R1B3(B) of 7 data segments extending between an address offset at 62 data segments and the end address EA.

For a second row, the first data segment of each VT is read from a corresponding first block R2B1 consisting of two sub-blocks: a first sub-block R2B1(A) of two data segments extending between an address offset at 4 data segments and the threshold address TH; and a second sub-block of R2B1(B) of 26 data segments extending from the start address S2. The second data segment of each VT is read from a corresponding second block R2B2 which consists of a pair of sub-blocks: a first sub-block of R2B2(A) of thirteen data segments extending from the threshold address TH; and a second sub-block R2B2(B) of fifteen data segments extending from an address offset at 54 data segments to the end address EA. The third data segment of each VT of the incoming row is read from a unitary payload memory block R2B3 of twenty-eight data segments extending between an address offset of 20 data segments and the finish address FA2 of the second incoming row.

For a third row of the outgoing SPE, a first data segment of each VT is read from a corresponding first payload memory block R3B1 consisting of a pair of sub-blocks: a first sub-block R3B1(A) of seven data segments extending from an address offset at 4 data segments; and a second sub-block R3B1(B) of twenty-one data segments extending from an address offset at 48 data segments to the end address EA. The second and third data segments of each VT of the third row are read from corresponding second and third unitary payload memory blocks (R3B3 and R3B4 respectively) of twenty-eight data segments extending from an address offset at 12 data segments to the end address EA.

Figure 6:
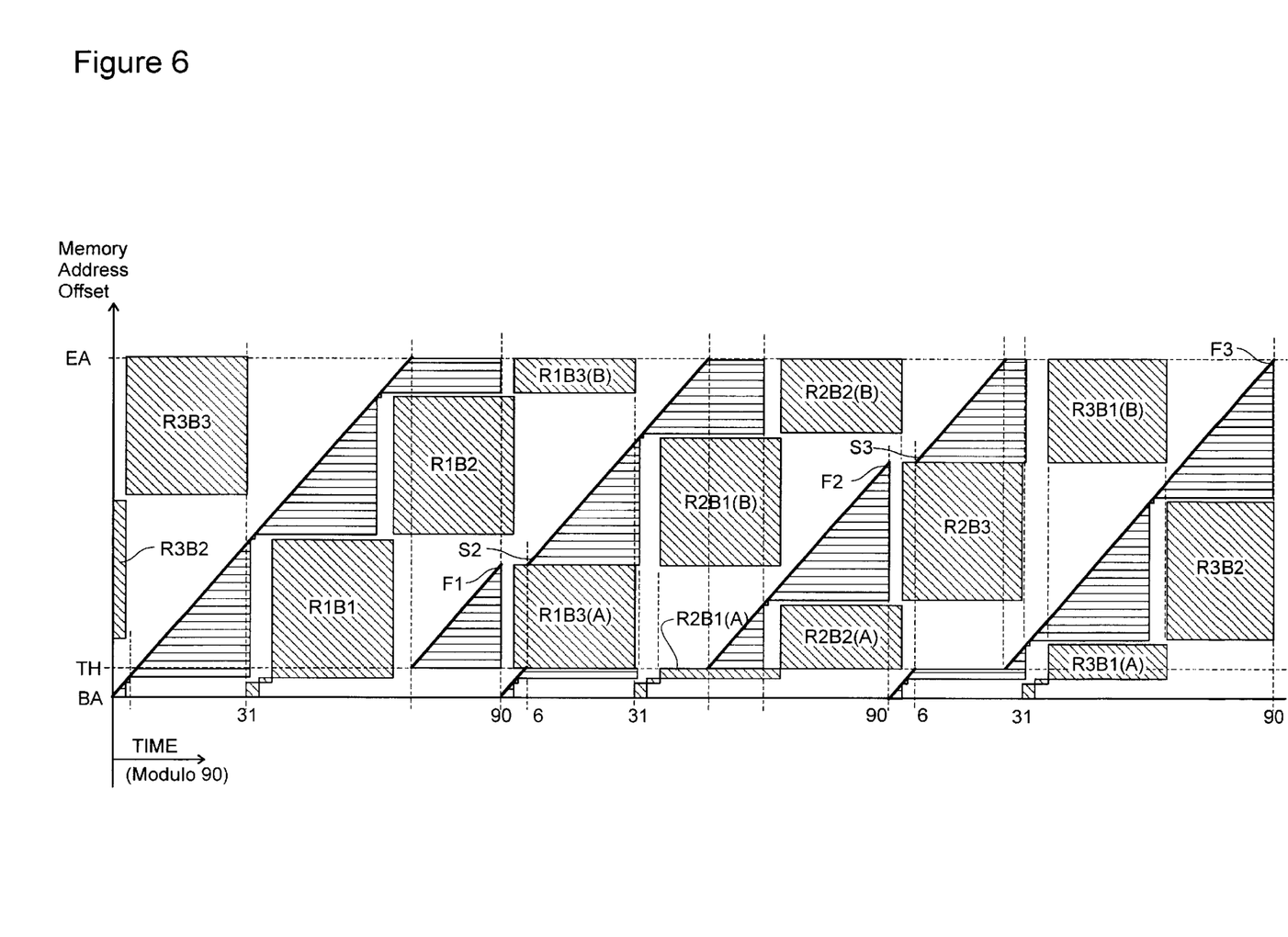
FIG. 6 is an address/time chart schematically illustrating interleaved reading and writing processes in accordance with an embodiment of the present invention in which incoming SPE's are SONET formatted and outgoing SPE's are SDH formatted.

FIG. 6 is an address/time chart illustrating timed write and read processes in which the incoming frame is SONET formatted (as in the embodiment of FIG. 5) and each outgoing frame is SDH formatted. As discussed above with respect to the embodiment of FIG. 5, the size and distribution of payload memory blocks RxBy is determined by the format of the incoming frame. Accordingly, the size and distribution of each of the payload memory blocks RxBy (and sub-blocks), is closely similar to that described above with respect to FIG. 5. However, in order to produce outgoing SPE's having an SDH format, the read sequence must be adjusted to provide one data segment of POH and two data segments of fixed stuff in the overhead portion of each outgoing row, and to omit any fixed stuff data segments embedded in the payload data of the incoming row. As shown in FIG. 6, the overhead portion of the outgoing row is formed by reading three data segments of TOH from a respective header block, and then the one data segment of POH within its respective header block is read three times to produce the required POH data segments. Payload data segments of the incoming SPE are then read from each of the payload memory blocks RxBy in substantially the same order as described above with respect to FIG. 5, except that the step of reading a fixed stuff data segment from its respective block RxSBn, between each block RxBy (at address offset at 32 and 61 data segments, respectively), is omitted.

The invention thereby significantly reduces RAM memory required for each cross-connection, while enabling automated protocol conversion and conventional channel reordering.

The embodiment(s) of the invention described above is(are) intended to be exemplary only. The scope of the invention is therefore intended to be limited solely by the scope of the appended claims.

We claim:

1. A method of cross connecting an incoming data stream to one or more outgoing data streams, each data stream comprising respective incoming and outgoing frames, each frame including one or more rows, each row comprising a respective plurality of data segments, the method comprising the steps of:
   a) providing a reserved memory space having a data storage capacity equal to an integer multiple of a data segment and less than one complete row;
   b) writing a data segment of an incoming row of an incoming frame to the reserved memory space
   c) subsequently reading the data segment from the reserved memory space to an outgoing row of an outgoing frame; and
   d) timing the writing and reading steps such that the data segment is read from the reserved memory space before being over-written by another data segment.

2. A method as claimed in claim 1, wherein each data segment comprises one or more bytes of data.

3. A method as claimed in claim 1, wherein the step of writing a data segment comprises a step of writing sequential data segments of the incoming frame to the reserved memory space in accordance with a predetermined first address sequence in which a start address for a given row commences immediately after a finish address of a previous row.

4. A method as claimed in claim 3, wherein the first address sequence is independent of a format of the incoming frame.

5. A method as claimed in claim 4, wherein the first address sequence is different for each successive row of the incoming frame and is repeated every three rows.

6. A method as claimed in claim 3, wherein the step of writing data segments of the incoming frame in accordance with the first address sequence comprises, for each row of the incoming frame, the steps of:
   a) writing sequential data segments of the incoming row to a sequential series of memory addresses between the base address and a predetermined threshold address;
   b) subsequently writing sequential data segments of the incoming row to a sequential series of memory addresses between a selected start address and the end address; and
   c) subsequently writing sequential data segments of the incoming row to a sequential series of memory addresses between the threshold address and a finish address.

7. A method as claimed in claim 6, wherein the predetermined threshold address is located at a fixed offset from the base address.

8. A method as claimed in claim 6, wherein the start address is selected on a basis of the finish address of an immediately preceding row.

9. A method as claimed in claim 8, wherein the start address is selected to correspond to:
   a) a next available memory address after the threshold address if the finish address of the previous row corresponds to the end address; and
   b) otherwise a next available address after the finish address of the previous row.

10. A method as claimed in claim 3, wherein the step of reading the data segment comprises the step of reading data segments of each one of the one or more outgoing frames from the reserved memory space between the base address and the end address in accordance with a predetermined second address sequence.

11. A method as claimed in claim 10, wherein the step of reading data segments in accordance with the second address sequence comprises, in respect of each incoming row, the steps of:
   a) successively accessing each one of a plurality of blocks of memory addresses, each block of memory addresses being smaller than the reserved memory address space and comprising a respective predetermined number of data segments; and
   b) reading one or more data segments of an outgoing frame from an accessed block of memory addresses.

12. A method as claimed in claim 11, wherein the step of successively accessing each one of a plurality of blocks of memory address comprises:
   a) accessing one or more header blocks corresponding to a group of overhead data segments of the incoming row; and
   b) accessing a plurality of payload memory blocks, each payload memory block corresponding to a respective block of payload data of the incoming row.

13. A method as claimed in claim 12, wherein each one of the one or more header blocks are accessed in succession, and then each one of the plurality of payload memory blocks are successively accessed.

14. A method as claimed in claim 12, wherein each payload memory block comprises a predetermined number of contiguous data segments.

15. A method as claimed in claim 14, wherein each payload memory block comprises 21 contiguous data segments.

16. A method as claimed in claim 14, wherein four payload memory blocks are accessed to read data segments of an entire row.

17. A method as claimed in claim 12, wherein a payload portion of the incoming row includes at least one data segment of embedded fixed stuff.

18. A method as claimed in claim 17, wherein the payload memory blocks are arranged to exclude the embedded fixed stuff data segment.

19. A method as claimed in claim 18, wherein at least one header block is accessed prior to accessing each payload memory block.

20. A method as claimed in claim 17, wherein at least one payload memory block is divided into two or more sub-blocks.

21. A method as claimed in claim 20, wherein each payload memory block encompasses a predetermined number of data segments, the predetermined number being defined by a sum of a number of data segments comprising each respective sub-block forming the payload memory block.

22. A method as claimed in claim 21, wherein the predetermined number of data segments encompassed by each payload memory block is the same for every payload memory block.

23. A method as claimed in claim 22, wherein the predetermined number of data segments within each group is 28.

24. A method as claimed in claim 11, wherein the step of reading one or more data segments of an outgoing SPE from an accessed block of memory addresses comprises a step of sequentially reading each data segment within the accessed block.

25. A method as claimed in claim 11, wherein the step of reading one or more data segments of an outgoing SPE from an accessed block of memory addresses comprises reading data segments in accordance with provisioned channel reordering.

26. A system for cross connecting an incoming data stream to one or more outgoing data streams, each of the incoming and outgoing data streams comprising respective incoming and outgoing frames, each frame including one or more rows, each row comprising a respective plurality of data segments, the system comprising:
   a) a reserved memory space having a data storage capacity equal to an integer multiple of a data segment and less than one complete row;
   b) means for writing a data segment of an incoming row of an incoming frame to the reserved memory space;
   c) means for reading the data segment of the incoming row to an outgoing row of an outgoing frame from the reserved memory space; and
   d) means for timing the writing and reading of the data segment such that the data segment is read from the reserved memory space before being over-written by another data segment.

27. A system as claimed in claim 26, wherein each data segment comprises one or more bytes of data.

28. A method as claimed in claim 26, wherein the means for writing a data segment comprises means writing sequential data segments of the incoming frame to the reserved memory space in accordance with a predetermined first address sequence in which a start address for a given row commences immediately after a finish address of a previous row.

29. A system as claimed in claim 28, wherein the first address sequence is independent of a format of the incoming SPE.

30. A system as claimed in claim 29, wherein the first address sequence is different for each successive row of the incoming frame and is repeated every three rows.

31. A system as claimed in claim 28, wherein the means for writing data segments of the incoming frame in accordance with the first address sequence comprises means adapted for:
   a) writing sequential data segments of the incoming row to a sequential series of memory addresses between the base address and a predetermined threshold address;
   b) subsequently writing sequential data segments of the incoming row to a sequential series of memory addresses between a selected start address and the end address; and
   c) subsequently writing sequential data segments of the incoming row to a sequential series of memory addresses between the threshold address and a finish address.

32. A system as claimed in claim 31, wherein the predetermined threshold address is located at a fixed offset from the base address.

33. A system as claimed in claim 31, wherein the start address is selected on a basis of the finish address of an immediately preceding row.

34. A system as claimed in claim 33, wherein the start address is selected to correspond to:
   a) a next available address beyond the threshold address if the finish address of the previous row corresponds to the end address; and
   b) a next available address beyond the finish address of the previous row otherwise.

35. A system as claimed in claim 28, wherein the means for reading the data segment comprises means for reading data segments of each one of the one or more outgoing frames from the reserved memory space between the base address and the end address in accordance with a predetermined second address sequence.

36. A system as claimed in claim 35, wherein the means for reading data segments in accordance with the second address sequence comprises means adapted for:
   a) successively reading each one of a plurality of blocks of memory address, each block of memory addresses being smaller than the reserved memory address space and comprising a respective predetermined number of data segments; and
   b) reading one or more data segments of an outgoing frame from an accessed block of memory addresses.

37. A system as claimed in claim 35, wherein the means adapted for successively access each one of a plurality of blocks of memory address comprises:
   a) means for reading one or more header blocks corresponding to a group of overhead data segments of the incoming row; and
   b) means for reading a plurality of payload memory blocks, each payload memory block corresponding to a respective group of payload data segments of the incoming row.

38. A system as claimed in claim 37, wherein each one of the one or more header blocks are read in succession, and then each one of the plurality of payload memory blocks are successively read.

39. A system as claimed in claim 37, wherein each payload memory block comprises a predetermined number of contiguous data segments.

40. A system as claimed in claim 39, wherein each payload memory block comprises 21 contiguous data segments.

41. A system as claimed in claim 39, wherein four payload memory blocks are read in each row.

42. A system as claimed in claim 37, wherein a payload portion of the incoming row includes at least one data segment of embedded fixed stuff.

43. A system as claimed in claim 42, wherein the payload memory blocks are read so that the embedded fixed stuff is excluded.

44. A system as claimed in claim 43, wherein at least one header block is read prior to reading each payload memory block.

45. A system as claimed in claim 42, wherein one or more of the payload memory blocks is subdivided into two or more sub-blocks.

46. A system as claimed in claim 45, wherein each payload memory block encompasses a predetermined number of data segments, the predetermined number being defined by a sum of a number of data segments comprising each respective sub-block of the payload memory block.

47. A system as claimed in claim 45, wherein the predetermined number of data segments included in each payload memory block is the same for every payload memory block.

48. A system as claimed in claim 46, wherein the predetermined number of data segments within each payload memory block is 28.

49. A system as claimed in claim 36, wherein the means for reading one or more data segments of an outgoing frame from a block of memory addresses comprises means for sequentially reading each data segment within the accessed block.

50. A system as claimed in claim 36, wherein the means for reading one or more data segments of an outgoing frame from a block of memory addresses comprises means for reading data segments in accordance with provisioned channel reordering.

* * * * *